United States Patent
Simard et al.

(10) Patent No.: US 8,288,457 B2
(45) Date of Patent: Oct. 16, 2012

(54) BLOCK FUNCTIONALIZATION METHODS

(75) Inventors: Benoit Simard, Orleans (CA); Jingwen Guan, Ottawa (CA); Stephane Dénommée, Ontario (CA)

(73) Assignee: National Research Council of Canada, Toronto (CA)

( * ) Notice: Subject to any disclaimer, the term of this patent is extended or adjusted under 35 U.S.C. 154(b) by 449 days.

(21) Appl. No.: 12/528,931

(22) PCT Filed: Feb. 28, 2008

(86) PCT No.: PCT/CA2008/000386
§ 371 (c)(1),
(2), (4) Date: Aug. 27, 2009

(87) PCT Pub. No.: WO2008/104078
PCT Pub. Date: Sep. 4, 2008

(65) Prior Publication Data
US 2010/0069604 A1    Mar. 18, 2010

Related U.S. Application Data
(60) Provisional application No. 60/903,836, filed on Feb. 28, 2007.

(51) Int. Cl.
*C08L 63/00* (2006.01)
(52) U.S. Cl. .......... 523/468; 977/778; 977/847
(58) Field of Classification Search ........... 523/468; 977/778, 847
See application file for complete search history.

(56) References Cited

U.S. PATENT DOCUMENTS

| | | | |
|---|---|---|---|
| 7,008,758 B2* | 3/2006 | Park et al. | 430/325 |
| 7,229,747 B2* | 6/2007 | Park et al. | 430/322 |
| 7,276,283 B2* | 10/2007 | Denes et al. | 428/403 |
| 2004/0071624 A1* | 4/2004 | Tour et al. | 423/447.1 |
| 2004/0101634 A1* | 5/2004 | Park et al. | 427/558 |
| 2004/0265755 A1* | 12/2004 | Park et al. | 430/322 |
| 2005/0074613 A1* | 4/2005 | Tour et al. | 428/408 |
| 2005/0207963 A1* | 9/2005 | Tour et al. | 423/447.1 |
| 2007/0004857 A1* | 1/2007 | Barraza et al. | 524/847 |
| 2007/0134599 A1* | 6/2007 | Raravikar et al. | 430/325 |
| 2008/0305321 A1* | 12/2008 | Raravikar et al. | 428/323 |
| 2009/0306276 A1* | 12/2009 | Magnet et al. | 524/556 |
| 2010/0143701 A1* | 6/2010 | Zhu et al. | 428/323 |

(Continued)

FOREIGN PATENT DOCUMENTS
JP    2007-138109    *    6/2007

(Continued)

OTHER PUBLICATIONS

Tiano, et al. Functionalization of Single-Wall Nanotubes for Improved Structural Composites. Society for the Advancement of Material and Process Engineering. Jan. 2000.*
Tour et al. e.g. C. A. Dyke and J. M. Tour, J. Am. Chem. Soc., 125, 1156 (2003).
Qin et al., (Chem Mat, 17, 2131 (2005).
Xu et al., (Chem Mat., 18, 2929 (2006).

(Continued)

*Primary Examiner* — Mark Eashoo
*Assistant Examiner* — Megan McCulley
(74) *Attorney, Agent, or Firm* — McMillan LLP

(57) ABSTRACT

Epoxy resins are chemically attached to carbon nanotubes (CNTs), in a one-step process in which a reaction mixture comprising the epoxy polymer, the CNTs and a bridging agent which is a chemical compound capable of forming living polymers, e.g. styrene or MMA is formed and radical formation is initiated in the reaction mixture; the epoxy polymer or monomer grafts onto the CNTs through the intermediary block of the bridging agent.

6 Claims, 1 Drawing Sheet

U.S. PATENT DOCUMENTS

| | | | |
|---|---|---|---|
| 2010/0247381 A1* | 9/2010 | Yodh et al. | 422/68.1 |
| 2011/0180140 A1* | 7/2011 | Zhai et al. | 136/256 |
| 2011/0224376 A1* | 9/2011 | Zhai et al. | 525/186 |

FOREIGN PATENT DOCUMENTS

| | | |
|---|---|---|
| JP | 2007138109 A2 | 6/2007 |
| WO | WO 2005/028174 A2 | 3/2005 |
| WO | WO 2005028174 A2 * | 3/2005 |

OTHER PUBLICATIONS

Qin et al., Macromolecules, 37, 752 (2004).

Xia et al., (Chem Mat., 15, 3879 (2003).

Liang et al.,(Chem Mat. 18, 4764 (2006).

Zhu et al. Nanoletter, 3, 1107 (2003).

Matrab et al., (Colloids and Surfaces A: Physicochem. Eng. Aspects, 287, 217 (2006).

\* cited by examiner

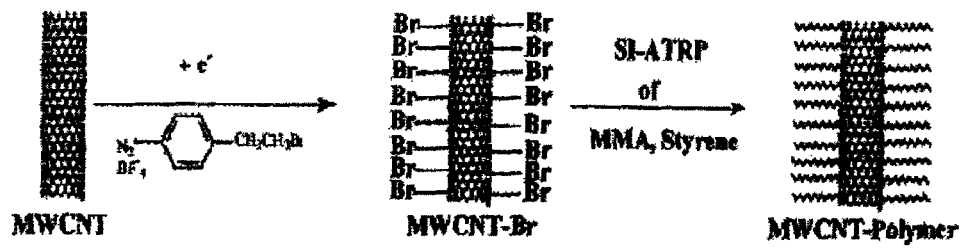
FIGURE 1 – PRIOR ART
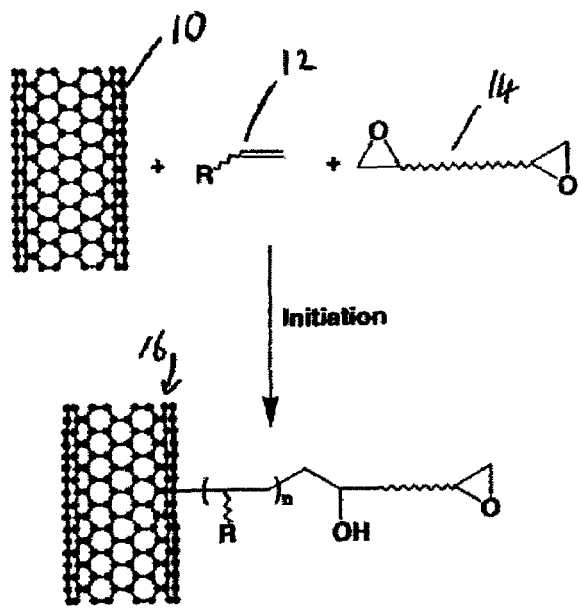
FIGURE 2

BLOCK FUNCTIONALIZATION METHODS

FIELD OF THE INVENTION

This invention relates to the field of nanotechnology. More particularly, it relates to carbon nanotubes, and to methods of attaching carbon nanotubes to structural materials such as epoxy resins.

BACKGROUND OF THE INVENTION

Carbon nanotubes (CNTs) are substantially cylindrical hollow architectures made of graphene sheets where the length-to-diameter ratio generally exceeds about 1,000. They have unusual properties making them potentially useful in applications such as nanotechnology, electronics, optics and other fields of materials science. They exhibit extraordinary mechanical, thermal and electrical properties. Their diameter is of the order of a few nanometers, and up to several millimeters in length. There are single-walled carbon nanotubes (SWCNTs), double-walled carbon nanotubes (DWCNTs) and multi-walled carbon nanotubes (MWCNTs), depending on the number of cylindrical graphene sheets forming the architecture.

For use in many applications, especially in composite applications, CNTs need to be bonded to other structural materials, for example to epoxy resins in thermoset composites. For this, i.e. grafting of chemical functions at the surface, functionalization is necessary. With SWCNTs, covalent functionalization will break some of the carbon-carbon double bonds and effectively leave a hole in the nanotube structure, with consequent modification of mechanical and electrical properties. With DWNTs, only the outer wall is modified.

BRIEF REFERENCE TO THE PRIOR ART

Attachment of CNT to epoxy resins generally requires at least two steps: functionalization of CNT followed by reactions with the epoxy resin. The functionalization of CNT to yield useful functionalities may itself require several steps, however. It would be preferable to prepare epoxy resins with CNT attached in a single step.

There is no publicly known single-step method to attach CNT to epoxy resin Attachment can also be made through methods involving 3 or more steps. For example:

Multi-Step Example 1

Step 1: SWCNT+Li/NH$_3$→Li intercalated SWCNT
Step 2: Li intercalated SWCNT+X—R—NH$_2$→SWCNT-R—NH$_2$+LiX (X=Br, I)
Step 3: SWCNT-R—NH$_2$+Epoxy resin→SWCNT functionalized resins
(Steps 1 & 2 based on Liang et al., NanoLetters, 4, 1257 (2004).)

Multi-Step Example 2

Step 1: SWCNT+4-hydroxymethyl-aniline+isoamyl nitrite→SWCNT-R—OH+other products
Step 2: SWCNT-R—OH+Na→SWCNT-R—ONa+H$_2$
Step 3: SWCNT-R—ONa+epoxy resin→SWCNT functionalized resins.
(Steps 1 and 2 based on work by Tour et al., e.g. C. A. Dyke and J. M. Tour, J. Am. Chem. Soc., 125, 1156 (2003).)

Multi-step functionalization works but is lengthy, costly and some of the steps require inert atmosphere conditions. It is also more costly than the production cost of SWCNT. Hence, it is frequently desired to reduce the number of steps.

The grafting of polystyrene by in-situ radical polymerization initiated by an anionic precursor has been demonstrated by Qin et al., (Chem Mat, 17, 2131 (2005). In situ polymerization of styrene initiated by gamma radiation has been demonstrated by Xu et al., (Chem Mat., 18, 2929 (2006)). Qin et al., also demonstrated the grafting of functionalized polystyrene via cycloaddition reaction (Macromolecules, 37, 752 (2004)).

Attachments of acrylate derivatives have also been demonstrated. For instance, in-situ polymerization of acrylate by sonication has been demonstrated on MWCNT by Xia et al., (Chem Mat., 15, 3879 (2003)). More recently, Liang et al., demonstrated in situ polymerization of MMA on Li-intercalated SWCNT in liquid ammonia (Chem Mat. 18, 4764 (2006))

Also of background interest is Zhu et al., (Nanoletter, 3, 1107 (2003)) and is depicted below,

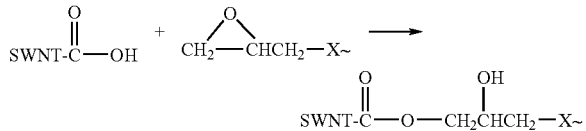

and the grafting of polystyrene and PMMA on brominated MWCNT according to the scheme depicted in "Prior Art" Figure A herein, and reported by Matrab et al., (Colloids and Surfaces A: Physicochem. Eng. Aspects, 287, 217 (2006))

However here, the reactions are not in a single step. The SWCNT need to be functionalized first either with —COOH or diazonium derivatives or other treatments.

In addition, these methods do not generally permit simple adjustments of spacer length between the carbon nanotube and the spacer backbone.

It is an object of the present invention to provide a novel process of functionalizing CNTs, and attaching them to epoxy resins.

SUMMARY OF THE INVENTION

There is provided herein a method permitting use of radical producing bridging agents such as styrene and methyl methacrylate (MMA) to connect CNT to epoxy resin monomer or polymers in one step. It is possible to carry out this method using neutral carbon nanotubes, including SWCNTs. The bridging agent anchors to the CNT through radical attack which propagates to the epoxide groups of the epoxy resin.

BRIEF REFERENCE TO THE DRAWINGS

FIG. 1 is a schematic drawing of a prior art process described by Matrab et. al., op. cit.:

FIG. 2 is a schematic drawing of an embodiment of the process of the invention.

DESCRIPTION OF THE INVENTION

The process can be schematized as shown on FIG. 2 of the accompanying drawings. A CNT 10 in admixture with a radical producing bridging agent 12 and an epoxy resin 14 is subjected to reaction initiation, resulting in opening of the double bond of the initiator to form radicals. These react at one end to the CNT 10 and at the other end to the epoxy resin 14 to form a bridging group, resulting in the epoxy-CNT bonded product 16, produced in a single step.

The initiation can be induced thermally, cationically or photolytically. The length of the bridging unit (e.g. styrene or MMA) moiety is adjusted by adjusting the molar ratios of bridging agent and epoxy resin. The length of the bridging agent is adjusted to determine the solubility or other properties required by the applications.

Any suitable bridging agent can be used, such as olefins (ethylene, propylene, butylene, isobutylene, etc) and their derivatives (acrylic acid, acrylates, methacrylates, ethacrylates, acrylonitrile, etc), polymerizable monomers such as lactone, lactam, etc. In order to be suitable a bridging agent needs to be able to form living polymers. Bridging agents permitting easy initiation of radicals (such as styrene and MMA) will frequently be preferred. As used herein, the term "epoxy resin" refers to any molecular species having an epoxide group and capable of undergoing block functionalization to CNT's as described herein.

The value of "n" (FIG. 2) is controlled by concentration ratio of monomer to terminator. The monomer here is the olefin and the terminator is the epoxide resin. "n" is preferably between 1 and 10000, between 10 and 8000, between 50 and 50000 or between 100 and 2000.

In an embodiment of the invention there is provided a one step method of functionalizing carbon nanotubes.

In an embodiment of the invention there is provided a method of functionalizing (uncharged) neutral carbon nanotubes.

In an embodiment of the invention there is provided functionalized carbon nanotubes.

In an embodiment of the invention there is provided CNTs functionalized by the addition of at least two "blocks" namely [Block 1] and [Block 2], wherein [Block 1] is a bridging agent and [Block 2] is an epoxide resin. In one embodiment the functionalized CNT will have a general structure CNT [Block 1]$_n$[Block 2]$_m$ where n and m are equal or greater than one.

In some instances it may be desirable to produce the structure CNT [[Block 1]n Block2]m]p where p is equal to or greater than 1. This can be done using this approach.

However, in most cases, p=1 will be preferred for epoxy resin applications. It will be apparent that this can be controlled through control of the stoichiometry or the amount of the reagents.

The process can also be carried out so that two different active species of CNT-Block1 attack on the two epoxide groups of the same epoxide molecule (monomer or polymer chain), so that cross-linking between CNTs occurs. It will be apparent that this can be controlled through control of the stoichiometry or amount of the reagents.

In an embodiment of the invention there is provided a resin comprising SWCNTs linked covalently to a bridging agent such as styrene or methyl methacrylate.

In an embodiment of the invention there is provided a reaction intermediate comprising a carbon nanotube covalently linked to a bridging agent.

The method disclosed herein allows adjustment of the spacer length between the SWCNT and the epoxy resin backbone thus offering potential adjustment of toughness without the need to add plasticizers and solubility of the functionalized SWCNT in various solvents.

SPECIFIC EXAMPLES

The chemical name of MY0510 is triglycidyl-p-aminophenol, available from Huntsman Chemical The molecular structure of resin MY0510 is:

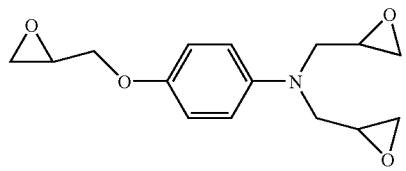

Example 1

Thermally Induced Initiation 56 mg of SWCNT was ground with a mortar with a few drops of THF and the mixture was sonicated in a small amount of THF in a sonication bath for 1 hour. After removing the THF by nitrogen flow, 10 ml (9.51 g) of freshly distilled styrene and 1.08 g of commercial MY0510 resin were added to the powder and sonicated under $N_2$ for 1.5 hrs and then stirred overnight at room temperature. The mixture was warmed up 60-70° C. for three days. Next, the mixture was diluted with THF and sonicated, and then centrifuged at 9000 RPM for 50 minutes. The precipitate was washed with THF once again by centrifugation. The solid was re-dispersed in THF. A black THF solution formed and was stable. The product was confirmed to contain functionalized SWCNTs linked to the epoxy resin.

It was determined that functionalization occurred using Raman spectroscopy, curing the functionalized SWNT and by the increased solubility.

Example 2

Cationic Initiation 50 mg of SWCNT was ground with a mortar with a few drops of THF and the mixture was sonicated in 25 ml of THF in a Schlenk flask under nitrogen for half an hour. 1 ml of (1.4 M in cyclohexane) sec-butyllithium was added to the well-suspended mixture at −78° C. After stirring for one hour, a solution of MY0510 and freshly distilled styrene in 10 ml of THF was added. The mixture was stirred overnight at dry-ice temperature, then warmed up to room temperature and stirred for an additional three days. The mixture was diluted with THF to 90 ml and centrifuged at 9000 RPM for 30 minutes. The liquid layer was slightly dark and discarded. The precipitate was washed with THF once again and the liquid phase was discarded. The precipitate was inserted into 100 ml of $CHCl_3$. After a brief sonication and centrifugation at 9000 rpm for 30 minutes, a very opaque, dark black solution resulted. The product was confirmed to contain functionalized SWCNTs linked to the epoxy resin.

Example 3

Photo-Induced Initiation 50 mg of SWCNT was ground with a mortar with a few drops of THF and transferred in a Schlenk flask containing 25 ml of THF. After sonication in a sonication bath for a half hour, a well-mixed solution of styrene and MY0510 in 10 ml of THF was added. The mixture was sparged with Ar, sonicated for an hour, and then subjected to 248 nm laser irradiation (KrF, 275 mJ and 210 mJ between circle aperture and lens, 10 Hz for 8 minute and 30 Hz for 8 minutes). After irradiation, the mixture was stirred at room temperature for 2 days. The mixture was diluted with THF to reach a total volume of 50 ml, sonicated for a few minutes, and then centrifuged at 9000 RPM for 30 minutes. The liquid phase was dark but transparent and was discarded. The precipitate was washed with THF (50 ml) through sonication/centrifuge cycle and the liquid phase was deep black and very opaque. The product was confirmed to contain functionalized SWCNTs linked to the epoxy resin.

As used herein the term "block functionalization" refers to chemical functionalization in which a "block" of molecules is attached to the CNT and another but different "block" attaches to the first block (the reaction may continue beyond this stage as well). Schematically:

SWNT-[Block1]-[Block2]

In the present examples block 1 is polystyrene or PMMA and block 2 is the epoxy resin. This is significantly different from the case where the two blocks are attached separately and directly to the SWCNT backbone. This would be called multiple functionalization

What is claimed is:

1. A functionalized carbon nanotube composite corresponding to the general formula:

CNT-[Block 1]-[Block 2]

wherein CNT represents the carbon nanotube, "Block 1" represents at least 1 monomeric unit derived from an olefin, olefin derivative, lactone or lactam bridging agent, and "Block 2" represents an epoxy resin.

2. The functionalized carbon nanotube composite of claim 1 wherein "Block 1" has from 1 to 10,000 monomeric units.

3. The functionalized carbon nanotube composite of claim 1 wherein "Block 1" has from 10 to 2,000 monomeric units.

4. The functionalized carbon nanotube composite of claim 1 wherein "Block 1" comprises polymerized styrene units.

5. The functionalized carbon nanotube composite of claim 1 wherein "Block 1" comprises polymerized methyl methacrylate units.

6. The functionalized carbon nanotube composite of claim 1 wherein CNT is a single walled carbon nanotube.

* * * * *